(12) United States Patent
Amit et al.

(10) Patent No.: US 10,257,066 B2
(45) Date of Patent: *Apr. 9, 2019

(54) INTERCONNECT CONGESTION CONTROL IN A STORAGE GRID

(71) Applicant: INTERNATIONAL BUSINESS MACHINES CORPORATION, Armonk, NY (US)

(72) Inventors: Jonathan Amit, Omer (IL); Zah Barzik, Rishon LeZion (IL); Vladislav Drouker, Holon (IL); Maxim Kalaev, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,447

(22) Filed: Nov. 7, 2017

(65) Prior Publication Data
US 2018/0091408 A1 Mar. 29, 2018

Related U.S. Application Data

(63) Continuation of application No. 14/682,573, filed on Apr. 9, 2015, now Pat. No. 9,876,698.

(51) Int. Cl.
*H04L 12/801* (2013.01)
*H04L 12/825* (2013.01)
*H04L 29/08* (2006.01)
*H04L 12/26* (2006.01)
*H04L 12/815* (2013.01)

(52) U.S. Cl.
CPC ......... *H04L 43/0882* (2013.01); *H04L 43/16* (2013.01); *H04L 47/22* (2013.01); *H04L 67/1097* (2013.01); *H04L 47/11* (2013.01); *H04L 47/25* (2013.01)

(58) Field of Classification Search
CPC ......... H04L 47/11; H04L 47/12; H04L 47/25; H04L 43/0876; H04L 43/0882; H04L 67/1097
See application file for complete search history.

(56) References Cited

U.S. PATENT DOCUMENTS 9,454,321 B1 * 9/2016 Smaldone ............... G06F 3/061
9,876,698 B2 * 1/2018 Amit .................. H04L 67/1097
(Continued)

*Primary Examiner* — Robert C Scheibel
(74) *Attorney, Agent, or Firm* — Griffiths & Seaton PLLC

(57) ABSTRACT

Methods, systems, and computer program product embodiments for controlling congestion in a storage grid, by a processor device, are provided. In a storage grid, a storage request transmit queue length of storage requests submitted by a plurality of nodes is monitored, the storage request transmit queue comprising a queue holding the storage requests unable to be transmitted through a current transmission control protocol/internet protocol (TCP/IP) socket buffer of the storage grid. Upon reaching at least one of a certain threshold, a watermarked message indicating a specific one of the plurality of nodes is congested is transmitted to upper layer grid nodes in a hierarchy of the plurality of nodes transmitting the storage requests, and the upper layer grid nodes each alter the storage requests based upon the watermarked message.

24 Claims, 4 Drawing Sheets

(56) References Cited

U.S. PATENT DOCUMENTS

| | | | |
|---|---|---|---|
| 2005/0108444 A1* | 5/2005 | Flauaus | H04L 41/0853 710/15 |
| 2010/0103816 A1* | 4/2010 | Eiro | H04L 12/4625 370/230 |
| 2010/0238941 A1* | 9/2010 | Matsuo | H04L 47/10 370/400 |
| 2010/0271725 A1* | 10/2010 | Kim | G06F 11/004 360/31 |
| 2011/0119679 A1* | 5/2011 | Muppirala | G06F 3/0611 718/105 |
| 2013/0297907 A1 | 11/2013 | Ki et al. | |
| 2014/0201425 A1 | 7/2014 | Clark et al. | |
| 2014/0310434 A1* | 10/2014 | Strange | G06F 3/0653 710/16 |
| 2015/0006663 A1 | 1/2015 | Huang | |
| 2015/0103667 A1* | 4/2015 | Elias | H04L 47/11 370/236 |
| 2016/0301611 A1* | 10/2016 | Li | H04L 47/12 |

* cited by examiner

INTERCONNECT CONGESTION CONTROL IN A STORAGE GRID

CROSS REFERENCE TO RELATED APPLICATIONS

This Application is a Continuation of U.S. patent application Ser. No. 14/682,573, filed on Apr. 9, 2015, now U.S. Pat. No. 9,876,698.

BACKGROUND OF THE INVENTION

Field of the Invention

The present invention relates in general to computers, and more particularly to a method, system, and computer program product for controlling congestion in a storage grid, such as in a software defined storage system (SDS) or SDS server environment.

Description of the Related Art

In today's society, computers are commonplace. Aside from home and personal computers, large corporations and businesses often use many systems interconnected together in a cluster to handle and store large amounts of data. As technology evolves, these storage systems have continued to become software based.

SDS or SDS server environments using architectures such as the industry standard InfiniBand® architecture, for example, may be used for interconnecting systems in cluster configurations, by providing a channel-based, switched-fabric technology. In such a configuration, data may be transmitted via messages which are made up of packets. Each device, whether processor or input/output (I/O), may include a channel adapter. The messages are typically transmitted from one device's channel adapter to another device's channel adapter via switches.

SUMMARY OF THE DESCRIBED EMBODIMENTS

Various embodiments for controlling congestion in a storage grid are provided. In one embodiment, the method comprises monitoring a storage request transmit queue length of storage requests submitted by a plurality of nodes, the plurality of nodes arranged in a hierarchy of the storage grid and the storage request transmit queue comprising a queue holding the storage requests unable to be transmitted through a current transmission control protocol/internet protocol (TCP/IP) socket buffer of the storage grid; wherein upon reaching at least one of a certain threshold, a watermarked message indicating a specific one of the plurality of nodes is congested is transmitted to upper layer grid nodes in the hierarchy of the plurality of nodes transmitting the storage requests, the upper layer grid nodes each altering the storage requests based upon the watermarked message.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
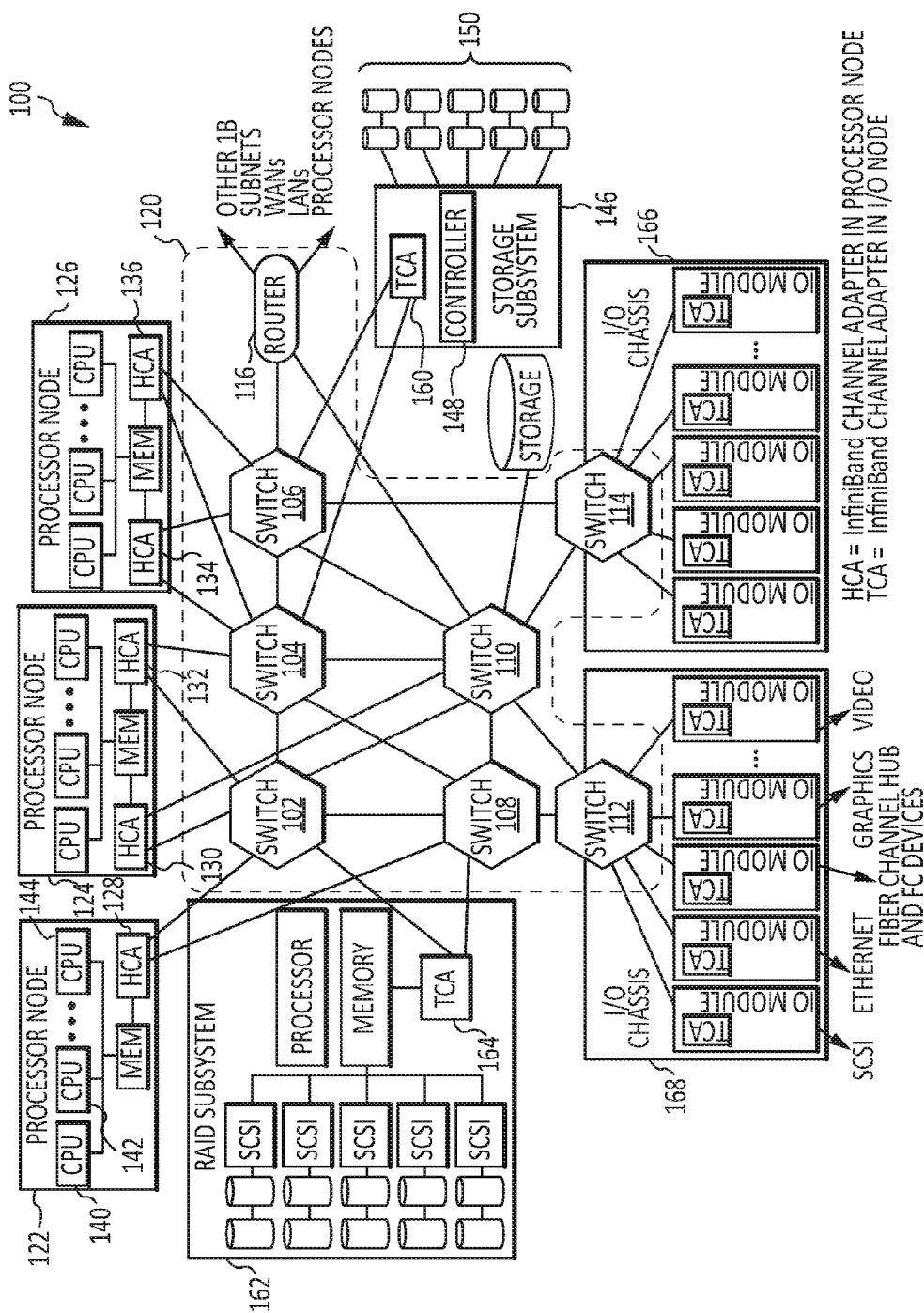
FIG. 1 illustrates an exemplary computing environment, more specifically a clustered storage system, in which aspects of the present invention may be implemented.

Modern storage arrays are moving away from physical hardware devices and transitioning to become software defined systems (SDS), or SDS server environments. Technical progression in systems such as these often dictates back end changes within the systems and the connections between them. For example, within storage arrays, the shift toward SDS requires necessary changes related to the backbone links within the array and the corresponding interconnections between its nodes. These interconnecting links are generally hidden from the end user and serves primarily for such purposes as data resiliency, cache coherency, snapshot management, mirroring, compression, cluster management, etc. within the storage arrays internal logic.

As aforementioned, InfiniBand®, for example, is an industry standard architecture that may be used for interconnecting systems in cluster configurations, by providing a channel-based, switched-fabric technology. In such a configuration, data may be transmitted via messages which are made up of packets. Each device, whether processor or input/output (I/O), may include a channel adapter. The messages are typically transmitted from one device's channel adapter to another device's channel adapter via switches.

Such as the aforementioned servers or systems may be implemented in an SDS, or software defined environment as will be further discussed. One example of such a server or storage environment may be a virtual storage area network (VSAN). Complex SAN configurations such as the aforementioned enable large numbers of computing components such as servers to access common storage via interconnection switches and cabling. The availability, integrity and recovery of these interconnections are critical to the reliable operations of the systems. VSANs, modeled after virtual local area networks (VLANs) are often used because of their flexibility in set up.

In systems such as Infiniband® architectures implemented in SDS or SDS server environments, the aforementioned changes are complicated by matters such as interconnecting links being replaced by Ethernet and TCP/IP protocols within the software defined storage grids, making the backbone interconnecting links more expensive with regard to CPU usage, latency, and total bandwidth capacity. For example, the storage grids nodes may begin to choke one another when an over-commit of work is placed on a specific node within the grid.

Present congestion control techniques include such methods as flow control systems that rate-limit some, or all, internal services according to various resource limits, such as disk queue depth or parallel jobs in the node. Under high load, nodes will pass as many requests as possible over the storage grid, however, the TCP/IP stack will inevitably consume a majority of the machine processing power. This leaves inadequate processing power for performing the actual storage input/output (I/O) operations themselves, and leaves the storage grid congested. Ultimately, this causes such failures as timer aborts regarding the delayed response times.

Accordingly, to address the deficiencies within current methods for congestion control, the present invention provides congestion control within the storage grid, accounting for the amount of processing power required to transfer data over the grid. More specifically, it enables the use of Ethernet TCP/IP networks for interconnect functions without leaving the grid congested and choked.

In one embodiment, the method comprises, monitoring a storage request transmit queue length; wherein upon reaching at least one of a certain threshold, a watermarked message is transmitted to a receiving node, the receiving node altering storage requests based upon the watermarked message.

In other words, the new interconnect congestion control is accomplished by monitoring the job transmit queue length. In a congested system, each message that is unable to transmit using the current TCP/IP socket buffer is added to this queue. Additionally, the new method provides a high watermark and a low watermark. When a predefined threshold is reached for the transmit queue, a high watermarked message is created and transmitted to upper level nodes within the grid.

In one embodiment, when upper level grid nodes receive this high watermarked message, indicating a specific node is experiencing a choked state, the upper level grid nodes will accommodate by slowing or ceasing storage I/O requests to the congested node. Similarly, when the transmit queue slows or becomes free and a low watermark is reached, the congested or choked message state message is ceased. Upper layer grid nodes then may resume the transmission of normal storage I/O requests.

Unlike traditional methods, such as a pool resource limit, when a choked state message is transmitted to upper level grid nodes, internal I/O job requests are still serviced by neighbor nodes. This is accomplished by broadcasting the choked state message to other grid nodes, indicating they should rate limit internal I/O job requests to the specific node indicating the congestion.

In one embodiment, each grid member monitors the choked state message of other nodes within the grid, as well as clearing the choked state message for any given node when the choked state message has not been broadcast for a predetermined amount of time. Again, a high watermark is maintained indicating a choked or congested state, which is broadcast to other nodes within the grid when a predetermined threshold has been reached. A low watermark, or lower threshold then clears this message, allowing normal I/O storage requests to continue. The watermarked messages may relate to a variety of internal queues regarding interconnect function within the storage grid.

Note that while in the aforementioned example, the high watermark and low watermark are thresholds regarding limiting I/O requests to a particular node experiencing congestion or a choked state. However, in other implementations, these watermarked messages may be used in other ways staying within the spirit of the invention. One example may be speeding I/O job requests when a particular watermark is reached or cleared. Other implementations may exist while staying within the scope of the aforementioned examples.

Turning now to the Figures, FIG. 1 illustrates an exemplary clustered storage system or clustered server system, such as an InfiniBand® implementation 100. Switches 102-114 and a router 116 form the subnet 120. Multiple processor nodes 122-126 may be connected to switches within the subnet 120 through InfiniBand® host channel adapters 128-136 to form a cluster. Although a single cluster is shown, multiple clusters, each including multiple processor nodes similar to nodes 122-126, can be connected to switches within the subnet 120 in other embodiments. One of the nodes of subnet 120 hosts a subnet manager node. For example, end node 108 includes a subnet manager 130 and subnet administrator and its database 132. Subnet manager 130 is used for discovery, configuration, and initialization of the fabric. In an embodiment, subnet manager 130 configures host channel adapters 128-136 with the local addresses for each associated physical port, i.e., the port's LID. Although the subnet manager 130 is generally depicted, in some embodiments it may be contained within a server, a console, a processor node, a storage subsystem, an I/O chassis or in another device connected to the subnet 120.

As illustrated by processor Node 122, a processor node may contain multiple CPUs 140-144 and may have a single InfiniBand® host channel adapter 128. As depicted, the host channel adapter 128 may be connected to both switch 102 and switch 108. As illustrated by processor node 124, a processor node may contain more than one host channel adapter 130 and 132 connected to different switches 102 and 104.

Each host channel adapter 128-136 may have a globally unique identifier (GUID) that is assigned by the channel adapter vendor. According to an embodiment, local identification numbers assigned by the subnet manager are static (i.e., they do not change from one power cycle to the next). Additionally, each port may have a port GUID assigned by the manufacturer.

Every destination within the subnet 120 may also be configured with one or more unique local identifiers (LIDs), which are statically assigned to each destination endpoint. In an embodiment, in order to maintain static assignment of the LIDs to each destination endpoint, the subnet manager 130 is provided with a mapping table including a mapping of GUIDs to corresponding LIDs. In another embodiment, the mapping table includes a mapping of LID assignments based on switch and port locations that are discoverable by both the subnet manager 130 and the destination endpoints. In still another embodiment, software logic defines a predetermined process for assigning LIDs and corresponding GUIDs.

Packets may contain a destination address that specifies the LID of the destination. From the point of view of a switch, a destination LID may represent a path through the switch. Switches 102-114 may be configured with routing tables and an individual packet may be forwarded to an output port based on the packet's destination LID and the switch's forwarding table.

Switches 102-114 may primarily pass packets along based on a destination address within the packet's local route header. Switches 102-114 may also consume packets required for managing the switches 102-114 themselves. Optionally, a switch port may incorporate the properties of a physical InfiniBand® host channel adapter. Switches 102-114 may also support delivery of a single packet to a single destination as well as the delivery of a single packet to multiple destinations.

Various types of storage devices may also be connected to switches within the subnet 120. A storage subsystem 146 containing a storage capacity 150, a controller 148 and an InfiniBand® host channel adapter 160 may be connected to switches 104 and 106. A RAID storage subsystem 162 may also be connected via InfiniBand® host channel adapter 164 to switches 108 and 102 within the subnet 120. As well as the storage subsystems 146 and 162, I/O chassis 166 and 168 may be connected to switches 112 and 114 respectively.

The mechanisms of the present invention may be applicable to a variety of network topologies, network components, and server type systems. According to one aspect of the present invention, FIG. 1, for example, may be a VSAN environment. Notwithstanding the illustration of some of the functionality attendant to the various embodiments however, one of ordinary skill will appreciate that the methodologies herein may be adapted to a wide variety of implementations and scenarios.

Figure 2:
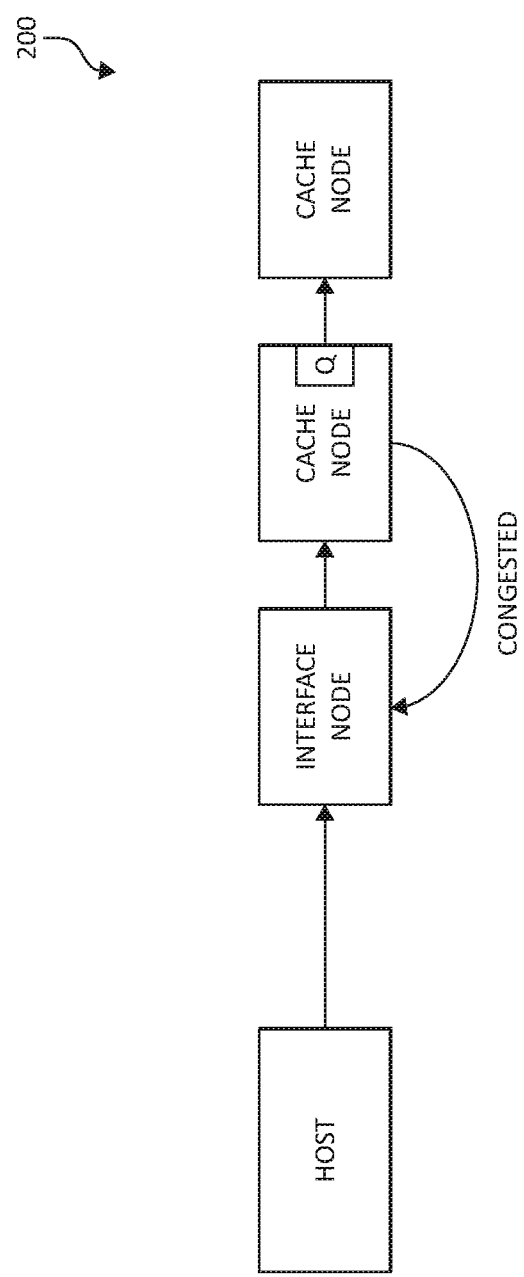
FIG. 2 illustrates a portion of a computing environment according to one aspect of the present invention.

FIG. 2 illustrates one aspect of one embodiment of the present invention 200. According to FIG. 2, a host 202 interacts with an interface node 204. A cache node queue 206 processes I/O requests for cache node 208. The cache node queue 206 is showing a congested state between the cache node 208 and the interface node 204. An exemplary implementation of the present invention method as aforementioned remedies the congested or choked state shown between the cache node queue 206 and the interface node 204.

The mechanisms of the present invention according to FIG. 2 may be implemented to monitor one or more distinct queue lengths. In one embodiment, for example, a flow depth control queue may be monitored within the storage server environment. In another embodiment, for example, a speed queue length may be monitored. In still another example, a duplex or duplex control queue length may be monitored within the storage or server system environment.

Figure 3:
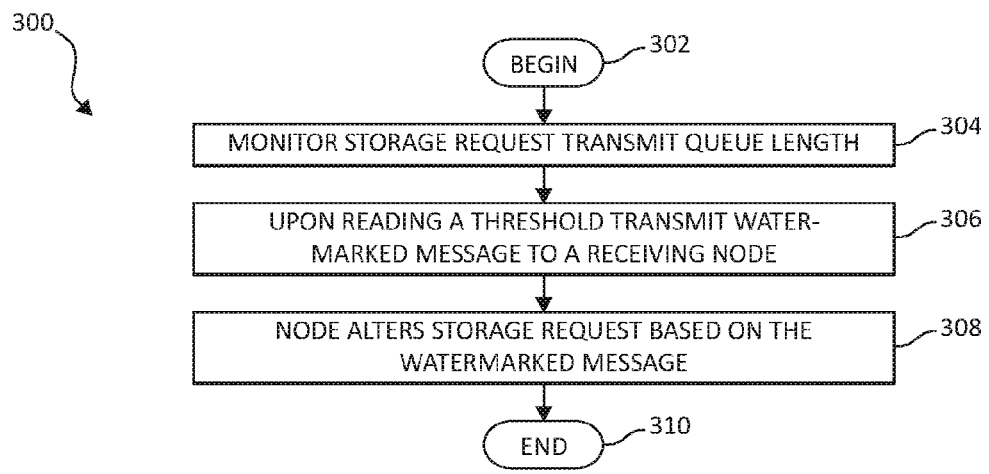
FIG. 3 illustrates a method according to one aspect of the present invention.

FIG. 3 illustrates a flow chart according to one embodiment of the present invention 300. Beginning at 302, a storage transmit queue length is monitored by nodes within the storage grid 304. Upon reaching a higher threshold, a high watermark is reached indicating that a congested or choked state message be transmitted to other receiving nodes within the grid 306. The nodes receiving the choked state message alter storage requests based upon the watermarked message 308. In the example given above, this indicates that nodes within the grid limit I/O requests to the particular node transmitting the message, however as aforementioned, other implementations may exist while staying within the scope of the present invention. The method ends 310.

Figure 4:
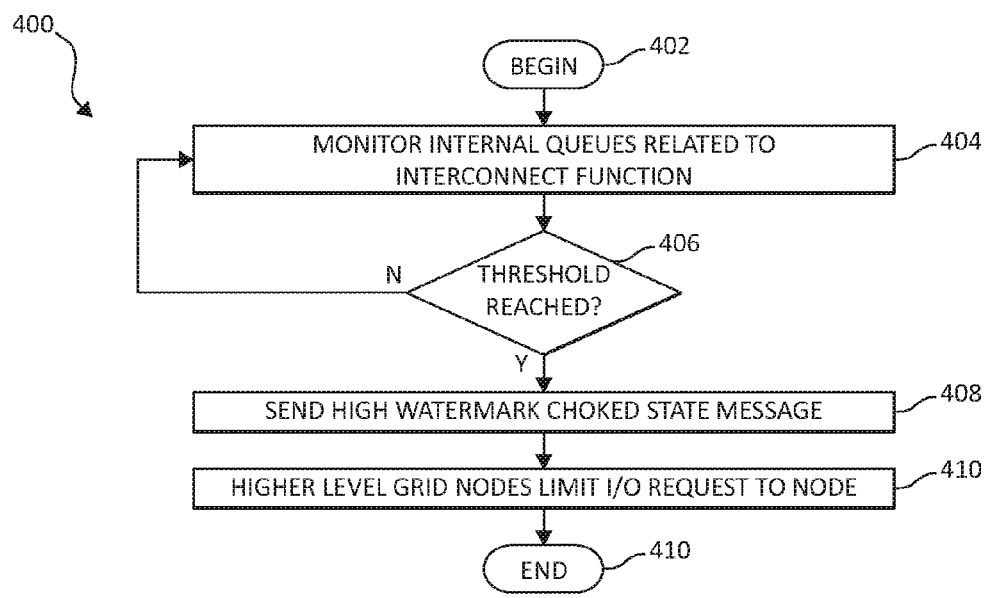
FIG. 4 illustrates an additional method according to one aspect of the present invention.

FIG. 4 illustrates an additional flow chart of a method according to one embodiment of the present invention 400. Beginning at 402, nodes monitor internal queues related to interconnect function within the storage grid 404. A determination of whether a predetermined threshold is reached regarding predetermined thresholds given to various internal queues within the grid 406. If the threshold has not been reached, nodes within the grid continue to process and request storage I/O jobs as normal and continue to monitor the internal queues 404. If a predetermined threshold has been reached, a high watermarked message is transmitted to other nodes within the grid, indicating a congested or choked state by the transmitting node 406. When a high watermarked message is transmitted to higher-level grid nodes, indicating a congested or choked state, the higher level grid nodes rate limit I/O requests to the node experiencing the congestion 408. Neighbor nodes take on the responsibility of assisting with the requests currently in transmission. The method ends 410.

Figure 5:
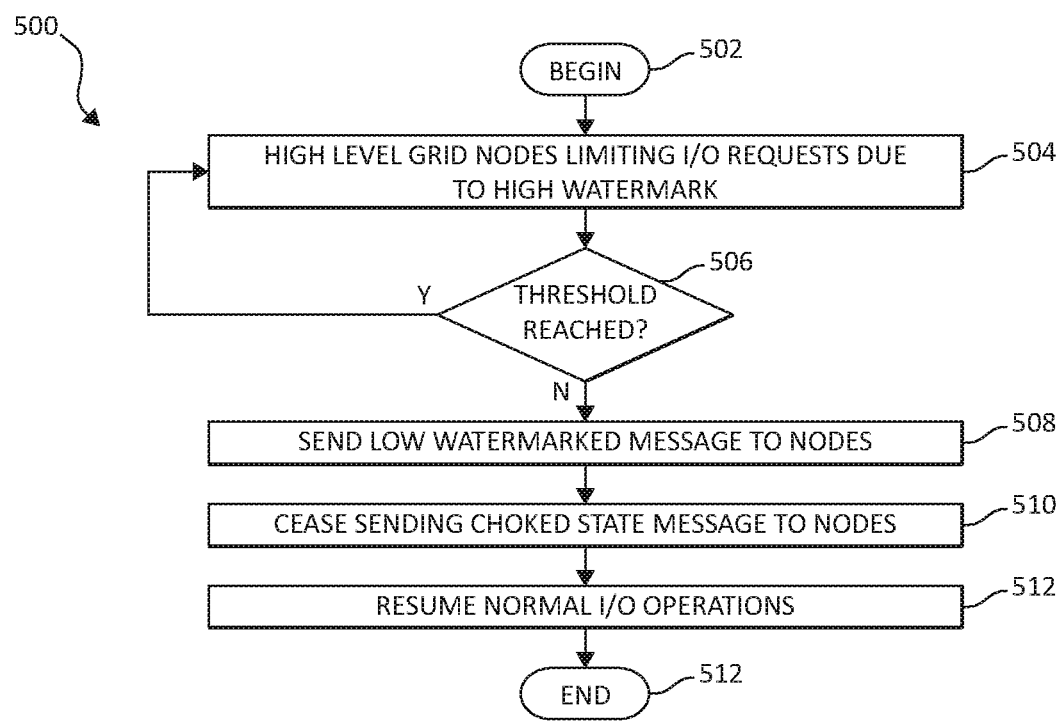
FIG. 5 illustrates still an additional method according to one aspect of the present invention.

FIG. 5 illustrates still an additional flow chart of a method according to one embodiment of the present invention 500. Beginning at 502, high-level grid nodes limit I/O requests to a particular node that has transmitted a high watermarked message indicating a congested or choked state 504. A determination of whether a predetermined threshold has been reached regarding internal interconnect function queues within the node 506. If the predetermined threshold is continually reached, higher-level grid nodes continue to rate limit I/O requests to the particular node experiencing and transmitting the congested, or choked state 504. If a predetermined threshold, or low watermark is reached, the choked state message is ceased transmission from the particular node 508. Higher-level grid nodes then cease rate limiting I/O requests and resume normal I/O operation job requests to the node 510. The method ends 512.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for congestion control in a storage grid, by a processor device, comprising:
monitoring a storage request transmit queue length of storage requests submitted by a plurality of nodes, the plurality of nodes arranged in a hierarchy of the storage grid and the storage request transmit queue comprising a queue holding the storage requests unable to be transmitted through a current transmission control protocol/internet protocol (TCP/IP) socket buffer of the storage grid; wherein upon reaching at least one of a certain threshold, a watermarked message indicating a specific one of the plurality of nodes is congested is transmitted to upper layer grid nodes in the hierarchy of the plurality of nodes transmitting the storage requests, the upper layer grid nodes each altering the storage requests based upon the watermarked message.

2. The method of claim 1, further including monitoring the storage transmit request queue length for a plurality of interconnecting links connecting the plurality of nodes, wherein the altered storage requests are based upon the watermarked message pertaining to the plurality of interconnecting links connecting the plurality of nodes.

3. The method of claim 1, further including defining a high watermarked message and a low watermarked message.

4. The method of claim 3, further including transmitting a choked state message to the upper layer grid nodes when the high watermarked message threshold is reached.

5. The method of claim 4, further including ceasing transmission of the choked state message to the upper layer grid nodes when the low watermarked message threshold is reached.

6. The method of claim 4, further including rate limiting, by the upper layer grid nodes, storage input/output (I/O) operations requests to the specific node transmitting the choked state message.

7. The method of claim 1, wherein the watermarked messages are applied to various internal queues related to storage interconnect function.

8. The method of claim 1, wherein the storage grid is a Software Defined Storage grid.

9. A system for congestion control in a storage grid, comprising:
- a storage grid;
- at least one processor device, wherein the processor device:
  - monitors a storage request transmit queue length of storage requests submitted by a plurality of nodes, the plurality of nodes arranged in a hierarchy of the storage grid and the storage request transmit queue comprising a queue holding the storage requests unable to be transmitted through a current transmission control protocol/internet protocol (TCP/IP) socket buffer of the storage grid; wherein upon reaching at least one of a certain threshold, a watermarked message indicating a specific one of the plurality of nodes is congested is transmitted to upper layer grid nodes in the hierarchy of the plurality of nodes transmitting the storage requests, the upper layer grid nodes each altering the storage requests based upon the watermarked message.

10. The system of claim 9, wherein the processor device monitors the storage transmit request queue length for a plurality of interconnecting links connecting the plurality of nodes, wherein the altered storage requests are based upon the watermarked message pertaining to the plurality of interconnecting links connecting the plurality of nodes.

11. The system of claim 9, wherein the processor device defines a high watermarked message and a low watermarked message.

12. The system of claim 11, wherein the processor device transmits a choked state message to the upper layer grid nodes when the high watermarked message threshold is reached.

13. The system of claim 12, wherein the processor device ceases transmission of the choked state message to the upper layer grid nodes when the low watermarked message threshold is reached.

14. The system of claim 12, wherein the processor device rate limits, by the upper layer grid nodes, storage input/output (I/O) operations requests to the specific node transmitting the choked state message.

15. The system of claim 8, wherein the watermarked messages are applied to various internal queues related to storage interconnect function.

16. The system of claim 8, wherein the storage grid is a Software Defined Storage grid.

17. A computer program product for congestion control in a storage grid by a processor device, the computer program product comprising a non-transitory computer-readable storage medium having computer-readable program code portions stored therein, the computer-readable program code portions comprising:
- an executable portion that monitors a storage request transmit queue length of storage requests submitted by a plurality of nodes, the plurality of nodes arranged in a hierarchy of the storage grid and the storage request transmit queue comprising a queue holding the storage requests unable to be transmitted through a current transmission control protocol/internet protocol (TCP/IP) socket buffer of the storage grid; wherein upon reaching at least one of a certain threshold, a watermarked message indicating a specific one of the plurality of nodes is congested is transmitted to upper layer grid nodes in the hierarchy of the plurality of nodes transmitting the storage requests, the upper layer grid nodes each altering the storage requests based upon the watermarked message.

18. The computer program product of claim 17, further including an executable portion that monitors the storage transmit request queue length for a plurality of interconnecting links connecting the plurality of nodes, wherein the altered storage requests are based upon the watermarked message pertaining to the plurality of interconnecting links connecting the plurality of nodes.

19. The computer program product of claim 17, further including an executable portion that defines a high watermarked message and a low watermarked message.

20. The computer program product of claim 19, further including an executable portion that transmits a choked state message to the upper layer grid nodes when the high watermarked message threshold is reached.

21. The computer program product of claim 20, further including an executable portion that ceases transmission of the choked state message to the upper layer grid nodes when the low watermarked message threshold is reached.

22. The computer program product of claim 20, further including an executable portion that rate limits, by the upper layer grid nodes, storage input/output (I/O) operations requests to the specific node transmitting the choked state message.

23. The computer program product of claim 17, wherein the watermarked messages are applied to various internal queues related to storage interconnect function.

24. The computer program product of claim 17, wherein the storage grid is a Software Defined Storage grid.

* * * * *